Nov. 27, 1951  F. S. GREEN  2,576,396
PANEL BOARD
Filed June 27, 1949
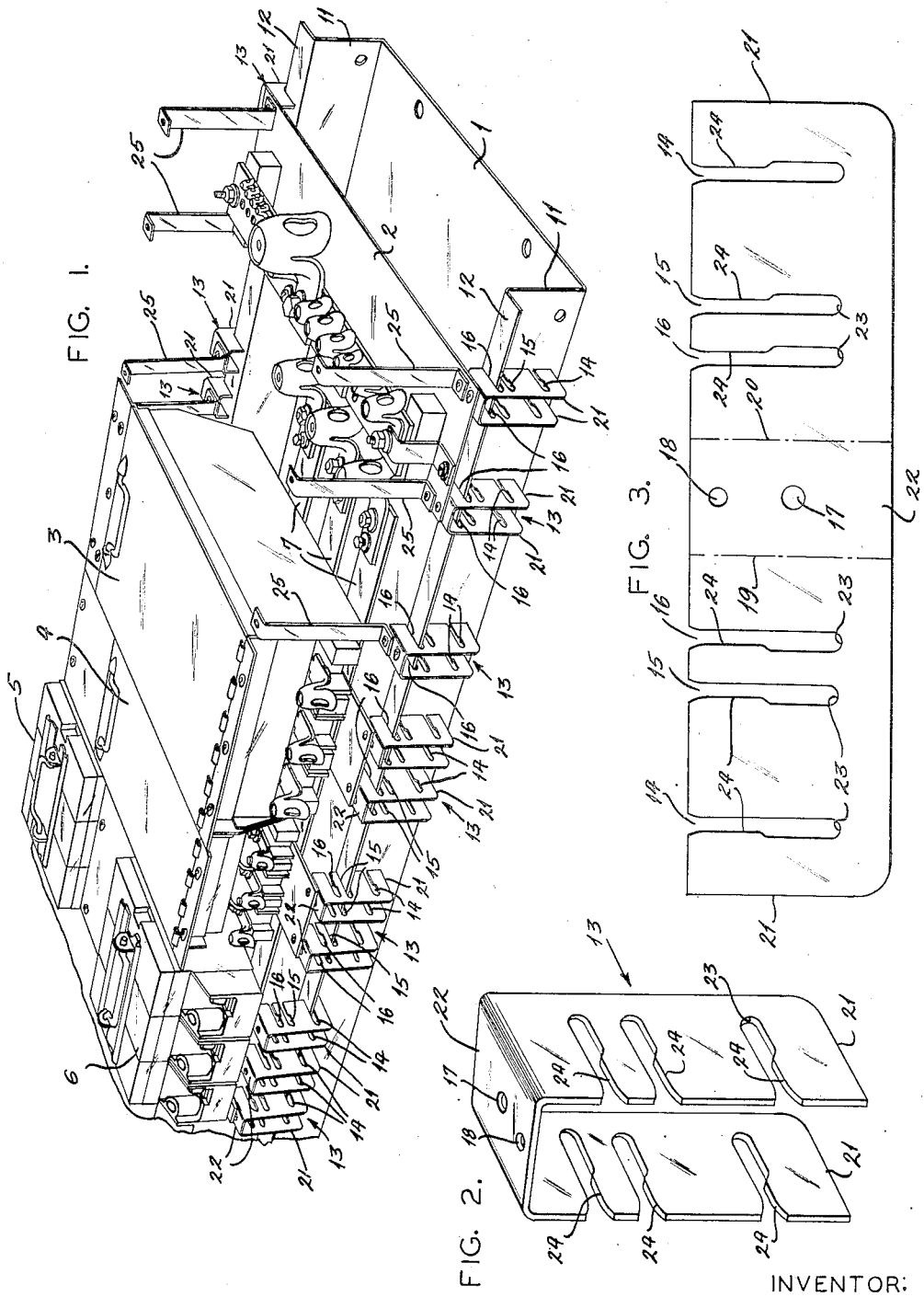
INVENTOR:
FLOYD S. GREEN
BY Bruninga and Sutherland
ATTORNEYS.

Patented Nov. 27, 1951

2,576,396

UNITED STATES PATENT OFFICE 2,576,396

PANEL BOARD

Floyd S. Green, St. Louis, Mo., assignor to Frank Adam Electric Company, St. Louis, Mo., a corporation of Missouri Application June 27, 1949, Serial No. 101,587

3 Claims. (Cl. 175—369)

This invention relates generally to the manufacture of panelboards and the like, and particularly to a mounting means of assembling various devices in a panelboard.

In the manufacture of panelboards, control panels, switchboards, and the like, it is common practice to provide a mounting back of channel section having out-turned margins at the free edges of the flanges. The depression between the flanges of the channel provides space for accommodating bus bars, cables, and other conductors, leading to and from the various devices which, assembled, constitute the panelboard, and provides room for making connections between such devices and the conductors. The several devices constituting the panelboard may include switches, circuit breakers, fuse boxes and instruments, or any other protective, control or indicating apparatus, all herein collectively called panel devices.

An ordinary panelboard may include a great variety of panel devices, and different sizes and capacities of each variety, depending upon the circumstances of use for which the panelboard is intended. The various panel devices in a given panelboard nearly always differ radically in dimensions, shape, and disposition of the mounting means thereon, so that assembly of the same with the mounting back has heretofore involved a great amount of tailoring the mounting back to fit the mounting requirements of the numerous panel devices to be assembled thereon. Such tailoring has required the drilling, and frequently the tapping, of numerous holes in the margin of the mounting back, the position of each hole, and frequently its size, being dictated by the precise location in which each particular panel device must be mounted, so that in all cases the holes provided in the mounting back for accommodating screws or bolts must be arranged so as to fit the corresponding mounting means on each individual panel device. For these reasons, assembly of panelboards has heretofore been a slow and costly process.

The object of the present invention, generally stated, is to reduce the tedium of assembling panelboards, and minimize the above mentioned tailoring of the mounting back.

This invention contemplates, in general, a panelboard or the like wherein the various panel devices are connected with the mounting back through universal fittings, which are quickly attachable at any selected position along the mounting back without necessitating the drilling of holes therein, and which provide a sufficient range of connecting positions to accommodate the mounting means of the usual panel devices. Preferably the universal fitting is arranged to embrace and grip a free edge of the mounting back in any position lengthwise of that edge, and with considerable latitude of position transversely. Adjustment in the third dimension is attained by providing the fitting with a plurality of sets of jaws, so that the appropriate one may be selected for embracing the free edge of the mounting back, depending upon the height of the panel device to be mounted thereon. In its preferred form, the invention contemplates that the universal fitting be formed of a strip of sheet metal bent into U-shape, so as to provide two nearly parallel legs interconnected by a flat bridge. Each leg of the fitting is provided with one or more slots, and the slots in the respective legs are aligned with each other in a direction substantially parallel with the flat bridge between the legs. The panel devices are connected with the flat bridge, or mounting portion, of the fitting.

One embodiment of a panelboard and universal fitting, as contemplated by the present invention, is shown in the accompanying drawing in which:

Figure 1 is a perspective view of a partially completed panelboard assembly, showing particularly the manner of mounting the several panel devices upon the mounting back;

Figure 2 is a perspective view of the universal fitting utilized in mounting the several panel devices upon the mounting back in the panelboard shown in Figure 1; and Figure 3 is a development view of the fitting shown in Figure 2, and represents the configuration of a flat sheet metal stamping, from which the fitting of Figure 2 is formed.

In common with the practice in the art, the panelboard shown in the drawings comprises a mounting back 1 upon which is assembled a neutral plate 2, enclosed switches 3 and 4, fuse boxes 5 and 6, and any other desirable panel devices, together with bus bars 7.

The mounting back 1 is a piece of sheet metal bent into channel section, having flanges 11 and out-turned margins 12, providing free edges. While in the embodiment shown in the drawings the flanges 12 are turned outwardly, it will be understood by those skilled in the art that under some circumstances it may be desirable to turn the margins 12 inwardly. In accordance with the present invention, the turned margins 12 extend for the full length of the mounting back 1, and provide throughout that length free edges for the reception of fittings 13 at any position along said margin, and in such number as may be required for mounting the several panel devices, as well as the decorative and protective front (not shown) of the panelboard.

The fittings 13 may be formed of a sheet metal stamping having, in the flat, a configuration such as shown in Figure 3. By appropriate dies, the stamping may be slotted as shown at 14, 15 and 16, and provided with one or more holes 17 and 18 in the same operation at which the stamping is cut from a larger sheet. If desired, the holes 17 and 18 may be tapped to provide screw threads. Where more than one hole is provided, it is frequently desirable to provide them of different sizes, as shown. After the stamping is cut out, it may be bent along lines 19 and 20 into the U-shape shown in Figure 2, so as to provide legs 21 interconnected by a central flat bridge 22, which latter embraces the region perforated by holes 17 and 18.

The slots 14, 15 and 16, respectively, in each of legs 21, are aligned with their counterpart in the other leg, so that the planes of the several slots are substantially parallel with the flat bridge portion 22 of the fitting. The legs 21 are preferably non-parallel, though nearly so, for a purpose which will appear hereinafter.

Each of the slots 14, 15 and 16 extends for a substantial depth into the leg 21, in a direction generally parallel to the lines of fold 19 and 20, but the bight 23 of the several slots is sufficiently remote from the nearest edge of the fitting to leave an uninterrupted web of metal of adequate strength for the purpose. Each of the slots is constricted as shown at 24 between the bight 23 and the mouth of the slot, so that near the mouth thereof the width of the slots is less than near the bight. By so configurating the several slots, and making the width of the slots at the constricted portion 24 a thousandth of an inch or so less than the thickness of the material from which the mounting back 1 is made, a drive fit may be obtained when the margin 12 of the mounting back is inserted in any one of the several pairs of slots 14, 15 and 16. Since the narrower portion of the slot is at 24, near the mouth thereof, the gripping area between the jaws (i. e., the metal on each side of the slots) and margin 12 does not increase as the degree of penetration of the margin 12 into the slots increases beyond the constricted portion 24. Consequently, whether the fitting is driven up on the margin 12 only to the extent of the depth of the constricted portion 24, or all the way to the bight 23, the gripping forces between the jaws of the fitting and the margin 12 remain substantially constant.

In Figure 1 of the drawing, a number of different relative positions of the universal fittings 13, with respect to the mounting back 1, are shown. The fittings 13, which support the fuse box 6, receive the margin 12 of the mounting back in the slots 14 thereof, and it will be observed that the margin 12 has penetrated the slots 14 only about half-way, so that the wider portion of the slot 14 is unoccupied. The opposite extreme is illustrated by the fitting 13, which carries a bracket 25 (for attachment of the panel-board front, not shown). In the latter instance, the margins 12 of the mounting back penetrate slots 16 to the full depth thereof. Intermediate positions of penetration are shown in the relation of the parts where the fittings 13 support panel devices 2, 3 and 4. The permissible difference in extent of penetration of the margin 12 into the respective slots therefore provides for ready adjustment in the transverse direction of the positions of the holes 17 or 18, in order to fit the corresponding mounting means of the several panel devices, irrespective of the non-uniformity of size of the panel devices.

In assembling the panelboard, the bus bars 7 are connected to the several panel devices in the usual manner, and finally, the panel devices are secured on the mounting back through the several universal fittings 13. The position of any fitting 13 may be adjusted to fit exactly with the mounting means of the panel device to be thereby received, such adjustment requiring no more tedium than a slight tap with a hammer to drive the fitting further on to margin 12, or to back it off slightly. Adjustment of the proper elevation of the mounting portion 22 of the fitting 13, above margin 12, is accomplished by selecting the appropriate set of slots 14, 15, or 16, into which the margin 12 is to be received.

If, as hereinbefore indicated, the legs 21 of the fitting 13 are nearly parallel but slightly diverging or converging, adding gripping force is achievable, as in the process of application the legs 21 will be moved toward parallel relation, and the resilience of the fitting (tending to move back toward the original non-parallel relation of the legs 21) applies a gripping force over and above that provided by the relative proportioning of the width of the slots.

In the assembly of panelboards in accordance with the present invention, and utilizing fittings of the character exemplified by fitting 13, it is unnecessary to drill holes in the margin of the mounting back except in extraordinary cases. The gripping force, provided by the engagement of the opposite sides of the several slots with the margin 12, is of sufficient tenacity that, when the several panel devices are secured to the fittings 13 on the mounting back, and connected with their bus bars, a strong and rugged assembly is provided, despite the absence of direct screw or bolt connections between the several panel devices and the mounting back.

From the foregoing description, those skilled in the art should readily understand that the invention accomplishes its object, and provides a universal fitting whereby great economies may be effectuated in the assembly of panelboards and the like, wherein standard panel devices, varying greatly in dimensions, shape, and location of their mounting means, are embodied.

While one embodiment of the universal fitting has been disclosed in detail, and the application of the same in a typical panelboard assembly has been described, it is apparent that the invention is not limited to the details of construction disclosed, but that numerous variations and adaptations will present themselves to those skilled in the art, without departing from the spirit of the invention, and such are contemplated.

Having thus described the invention, what is claimed and desired to be secured by Letters Patent is:

1. A panelboard having a mounting back having a free edge, a U-shaped fitting formed of relatively thin stiff material, each leg of the U having a plurality of slots aligned with corresponding slots in the other leg, said slots having a width such as to provide a drive fit over said free edge, and a panel device secured to the bridge of said fitting.

2. A panelboard comprising a mounting back having a free edge, a fitting formed of relatively thin stiff material bent to define a leg and a flat, said leg having a slot extending from one edge of said leg and providing an open mouth thereat, said slot being near its mouth of a width such as to provide a drive fit with said free edge of said mounting back, and being wider near its bight, and a panel device secured to said flat.

3. A panelboard comprising a mounting back having a free edge, a fitting formed of relatively thin stiff material bent to define a leg and a flat, said leg having a plurality of parallel slots each terminating in an open mouth at one edge of said leg, the distance between said slots being greater than the thickness of said material, and a panel device secured to said flat.

FLOYD S. GREEN.

REFERENCES CITED

The following references are of record in the file of this patent:

UNITED STATES PATENTS

| Number | Name | Date |
| --- | --- | --- |
| 853,344 | Dennis | May 14, 1907 |
| 1,345,340 | Alphin | July 6, 1920 |
| 1,843,014 | Corino | Jan. 26, 1932 |
| 2,171,441 | Barry | Aug. 29, 1939 |
| 2,219,887 | Bowly | Oct. 29, 1940 |
| 2,261,857 | Novak | Nov. 4, 1941 |

FOREIGN PATENTS

| Number | Country | Date |
| --- | --- | --- |
| 567,023 | Germany | Dec. 12, 1932 |